(12) United States Patent
Rao

(10) Patent No.: US 11,367,008 B2
(45) Date of Patent: Jun. 21, 2022

(54) ARTIFICIAL INTELLIGENCE TECHNIQUES FOR IMPROVING EFFICIENCY

(71) Applicant: Cognitive Ops Inc., Atlanta, GA (US)

(72) Inventor: Krishnaswamy Srinivas Rao, Atlanta, GA (US)

(73) Assignee: Cognitive Ops Inc., Atlanta, GA (US)

( * ) Notice: Subject to any disclaimer, the term of this patent is extended or adjusted under 35 U.S.C. 154(b) by 40 days.

(21) Appl. No.: 16/865,249

(22) Filed: May 1, 2020

(65) Prior Publication Data
US 2021/0342723 A1 Nov. 4, 2021

(51) Int. Cl.
G06N 5/04 (2006.01)
G06F 16/28 (2019.01)
G06F 16/25 (2019.01)
G06N 20/00 (2019.01)

(52) U.S. Cl.
CPC .......... *G06N 5/043* (2013.01); *G06F 16/258* (2019.01); *G06F 16/285* (2019.01); *G06N 20/00* (2019.01)

(58) Field of Classification Search
CPC ...... G06N 5/043; G06N 20/00; G06F 16/285; G06F 16/258
See application file for complete search history.

(56) References Cited

U.S. PATENT DOCUMENTS

| | | | |
|---|---|---|---|
| 8,073,731 B1 | 12/2011 | Rajasenan | |
| 8,352,414 B2 | 1/2013 | Bhamidipaty et al. | |
| 8,619,084 B2 | 12/2013 | Curbera et al. | |
| 9,053,437 B2 | 6/2015 | Adler et al. | |
| 9,324,038 B2 | 4/2016 | Charif et al. | |
| 9,355,371 B2 | 5/2016 | Goodwin et al. | |
| 9,372,736 B2 | 6/2016 | Curbera et al. | |
| 9,555,544 B2 | 1/2017 | Bataller et al. | |
| 9,729,639 B2 | 8/2017 | Sustaeta et al. | |
| 2013/0144803 A1 | 6/2013 | Chang et al. | |
| 2015/0026163 A1* | 1/2015 | Haggar | G06F 16/24578 707/723 |

(Continued)

OTHER PUBLICATIONS

Yang, "Applied process mining, recommendation, and visual analytics," Diss Rutgers University—School of Graduate Studies, 2019.

(Continued)

*Primary Examiner* — Li B. Zhen
*Assistant Examiner* — Henry Nguyen
(74) *Attorney, Agent, or Firm* — Cognition IP, P.C.; Edward Steakley; Rajesh Fotedar

(57) ABSTRACT

Disclosed are systems and methods providing for automation of enterprise and other processes. The systems and methods involve receiving historical process data, applying process mining techniques and generating process models. The process models can be used to identify automation candidates. One or more automation tools designed and configured for the identified automation candidates can be deployed to automate or to increase the efficiency of the process. In one embodiment, automation tools include artificial intelligence networks, which can label a set of input data according to determined or preconfigured domain-specific labels. An aggregator module can combine the similarly labeled data as part of automating a process or to increase the efficiency of a process.

18 Claims, 11 Drawing Sheets

(56) References Cited

U.S. PATENT DOCUMENTS

| | | | | |
|---|---|---|---|---|
| 2015/0339765 | A1* | 11/2015 | Dubey | G06Q 40/00 |
| | | | | 705/35 |
| 2017/0076246 | A1* | 3/2017 | Volkov | G06N 5/04 |
| 2019/0138422 | A1* | 5/2019 | Wendisch | G06F 17/40 |
| 2020/0034772 | A1* | 1/2020 | Balan | G06Q 40/125 |
| 2020/0105248 | A1* | 4/2020 | Hirzel | G10L 15/187 |
| 2020/0160399 | A1* | 5/2020 | Rakshit | A61B 5/165 |
| 2021/0150631 | A1* | 5/2021 | Resheff | G06Q 40/02 |
| 2021/0264458 | A1* | 8/2021 | Kramme | G06Q 30/0225 |

OTHER PUBLICATIONS

"How Microsoft uses process mining to accelerate digital transformation," retrieved May 4, 2020 <https://www.microsoft.com/en-us/itshowcase/how-microsoft-uses-process-mining-to-accelerate-digital-transformation>.

Wil van der Aalst, "Discovering Petri Nets," Eindhoven University of Technology, retrieved May 4, 2020.

Federico Berruti et al., "Intelligent process automation: The engine at the core of the next-generation operating model," McKinsey Digital, Mar. 2017.

Ron Schmelzer, "The Vision of Fully Autonomous Business Process (ABP)," Aug. 23, 2018.

Kebede et al., "Comparative evaluation of process mining tool," University of Tartu (2015).

Da Silva et al., "Process Mining: Application to a case study," (2014).

Van der Aalst et al. "A Tour in Process Mining: From Practice to Algorithmic Challenges," Transactions on Petri Nets and Other Models of Concurrency XIV, Springer, Berlin, Heidelberg, 2019, pp. 1-35.

De Leoni et al., "A general process mining framework for correlating, predicting and clustering dynamic behavior based an event logs," Information Systems, vol. 56 (2016), pp. 235-257.

Leemans et al., "Process and Deviation Exploration with Inductive Visual Miner," BPM (Demos) 1295.46 (2014): 8.

Altexsoft, "How Robotic Process Automation (RPA) Applies Artificial Intelligence: Cognitive Automation, Technology Analysis, and Use Cases," Jul. 19, 2019.

* cited by examiner

ARTIFICIAL INTELLIGENCE TECHNIQUES FOR IMPROVING EFFICIENCY

BACKGROUND

Field of the Invention

This disclosure relates generally to the field of artificial intelligence, and more particularly to using artificial intelligence techniques for automating enterprise and other processes.

Description of the Related Art

Modern computers have allowed substantial improvements in various economically-important processes, such as manufacturing processes, business processes and others. Today's tasks are performed with more automation than were previously possible. Nonetheless, existing process automation technology relies substantially on human input, which can make performance of such processes inefficient and resource-intensive. An example of a modern process that can still be inefficient despite application of existing process automation technology is generating financial reports by corporations.

Large publicly-traded corporations release earnings reports once per quarter and at the end of the year. Large numbers of accounting systems and reporting systems must process a large quantity of data before a report may be generated. Typically, the process to generate an earnings release may take 20 days of work or more, and involve multiple teams, controllers, accountants and shared services employees. In some instances, corporations may have multiple locations in different tax jurisdictions, states, municipalities, countries or trade zones. Each of these business locations may need one or more teams to analyze accounts and may need to collaborate with teams from other location. Controllers may then receive and consolidate the reports from a plurality of teams. The controllers must then validate the data received. Furthermore, controllers may not receive all the data required to validate the reports and must log into different accounting systems or enterprise resource planning (ERP) systems to obtain the required data. When manually performed, this process may take 300 to 400 people to complete the earnings release and validation. The manual determination of automatable tasks and activities as well as the programming and generation of bots to perform those tasks and activities is time intensive and requires large teams to accomplish.

Similarly, other business processes, such as a manufacturing, human resources, computer and network security lack robust automation technology, with points of inefficiency as described above in relation to generating financial reports.

Enterprise activities and tasks may range from simple and repeatable ones to complex activities and business processes that require in-depth knowledge, analysis and decision making. The current way of automating such activities and tasks is to use a combination of outsourcing and robotic process automation that can record and play back simple activities. This approach usually requires constant manual updates as the process and applications change. This also leads to a proliferation of bots, sometimes in the thousands, but benefits start declining quickly as the tasks get more complex and require higher cognition.

Traditionally, to automate processes, users are recorded performing tasks and variables used in the performance of the task are determined. The variables are then substituted with an input stream or values calculated dynamically and are then replayed by bots to complete the task with the new variables. This automation task may perform as designed as long as no changes are made to the process flow, platform, application program interface (API), data fields or any number of modifications. Once changes are made to a task, the automation process, that was previously created for it, is manually corrected or changed. These changes can include changing or modifying automation bots. Small changes or modifications to fields or parameters of processes may become hard to manage when dealing with a large number of bots. Traditionally, each bot would need to be modified to take into account any new input or output required for the specific process. Even things as minor as positioning or ordering of fields may be enough to cause a bot or series of bots to fail. This can be very time consuming and expensive. As a result, traditional automation may require implementing multiple automation tools to cover the full business process. Consequently, there is a need for more robust automation systems and methods which can provide for automating higher cognition tasks, end-to-end processes visibility and be easily and accurately modifiable.

SUMMARY

The systems and methods described herein provide for the automation of enterprise business activities and tasks. In one embodiment, the system may receive historical process data associated with one or more computer systems executing the process. The system may then apply process mining techniques to the historical process data to generating an end-to-end process model for the process. The system may then generate a digital representation of the process, based at least partly on the process model, and determine, from the digital representation, automation candidates. The system may then identify automation tools for the automation candidates and configure the automation tools for the candidates.

Another embodiment relates to validation financial reports. The automation tools may comprise one or more machine learning tools. The system may receive unstructured process input data relevant to validating the financial report. The system may transform the unstructured input data to indexed and searchable structured input data. The system may configure the automation tools by training the machine learning tools to label portions of the structured input data with categories relevant to validation of the financial report. The system may then receive a financial report tagged with a category, identify labels corresponding to the tagged category, use the trained machine learning tools to identify portions of the structured input data corresponding to the identified labels. Then the financial report may be validated based at least partly on the identified portions of the structured input data and regenerated with visual elements indicating the results of the validating.

Another embodiment may also relate to the validation or financial reports. The automation tools may comprise one or more machine learning tools. The system may receive unstructured process input data relevant to validating the financial report. The system may transform the unstructured input data to indexed and searchable structured input data. The system may configure the automation tools by training the machine learning tools to label portions of the structured input data with categories relevant to validation of the financial report. The system may then receive a structured query. Labels may then be identified corresponding to a response to the structured query. The trained machine learning tools, may identify portions of the structured data corresponding to the identified labels and using the identified portions of the structured input data, generate the response to the structured query.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
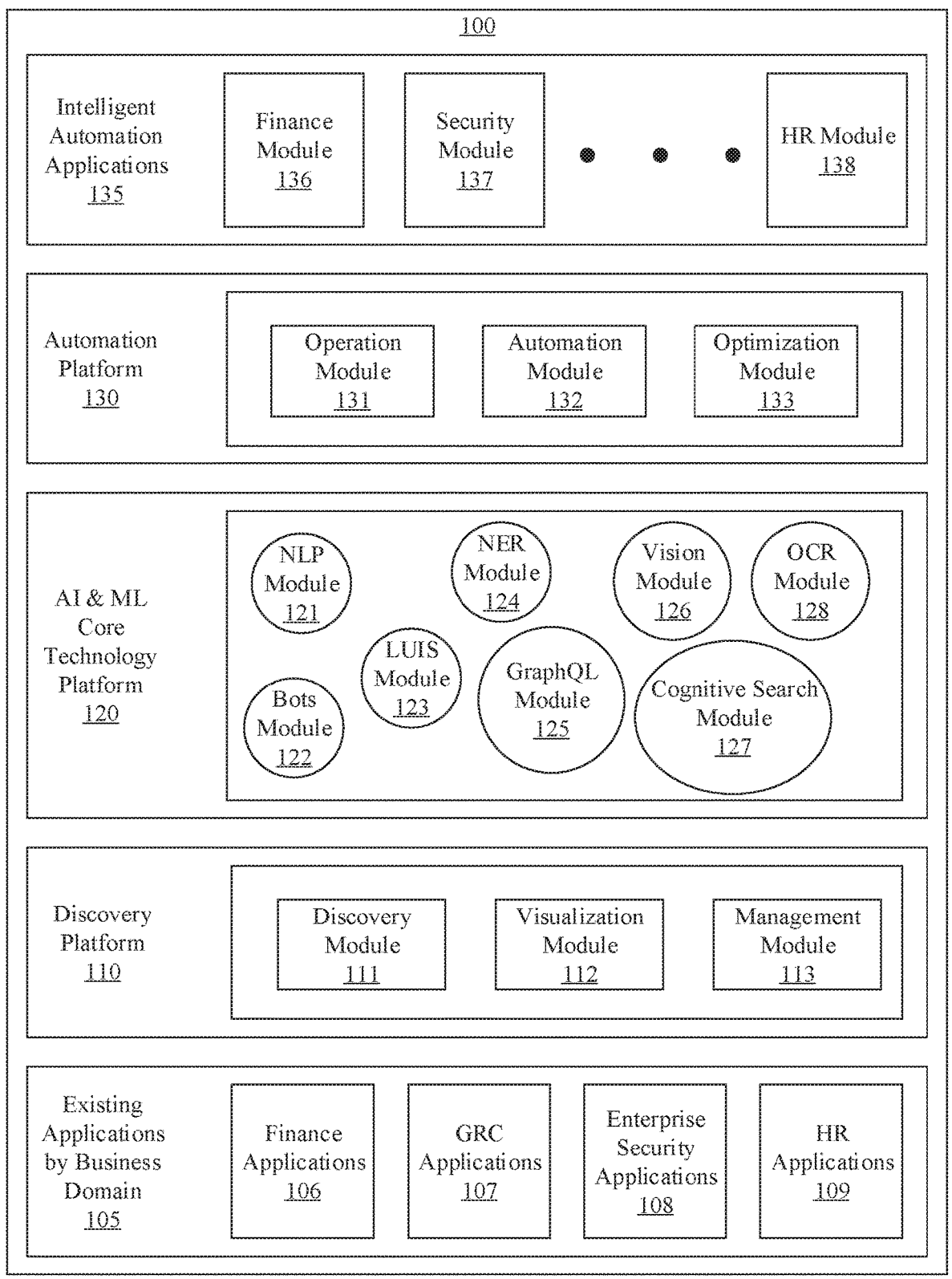
FIG. 1 illustrates an example of an architecture for automating enterprise processes in accordance with aspects of the present disclosure.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to the automation of enterprise business activities and tasks. These enterprise business activities and tasks may range from simple repeatable ones to complex activities and business processes that require in-depth knowledge, analysis and decision making. The automation of business activities and tasks may be accomplished through the implementation of intelligent automation applications. The intelligent automation applications may be domain-specific. For example, the intelligent automation applications may include modules for automating financial tasks, such as invoicing, validation of earning reports and the generation of earning reports. Another example would be the automation of human resource (HR) processes such as, new employee hiring and onboarding, tracking and updating employee profile data, validating and tracking timesheets, performance appraisals, offboarding, leave requests, expense claims, managing of training requests, reporting of incidents and safety hazards and the updating of an employee's benefits. Another example would be the automation of security processes such as, detection of threats in the enterprise environment, triaging potential threats, action response determination, deleting or quarantining suspected malware-infected files, performing a geolocation lookup on a given IP address, searching for files on a particular endpoint, blocking a URL on perimeter devices and quarantining devices from the network.

FIG. 1 illustrates an example of an architecture 100 for automating enterprise processes in accordance with aspects of the present disclosure. The architecture 100 may include existing applications by business domain 105, discovery platform 110, artificial intelligence and machine learning (AI & ML) core technology platform 120, automation platform 130 and intelligent automation applications 135. The automation of enterprise business processes may utilize an integrated approach machine learning and artificial intelligence to automate the full spectrum of business processes in an Enterprise. The architecture 100 involves several components that together provide an end to end business process automation. The entire automation stack covers several components that operate in an integrated fashion to deliver a continuously learning and intelligent automation solution to address an enterprise need.

Existing applications by business domain 105 may comprise finance applications 106, governance risk and compliance (GRC) applications 107, enterprise security applications 108 and HR applications 109 or others. These applications may be used within an enterprise to perform enterprise tasks and activities manually or with some degree of automation. The manual activities and tasks may be recorded and analyzed in order to identify which are candidates for further automation and those which are not.

Discovery platform 110 may comprise discovery module 111, visualization module 112 and management module 113. Discovery platform 110 may monitor and record user and application activities as well as inputs and outputs to the applications and intermediary data generated by the application. The application and user can refer to the existing applications by business domain 105 and the user can refer to the user of the existing applications by business domain 105. The data collected may then be analyzed by discovery module 111.

Discovery module 111 may use process mining techniques applied to application and user footprints, digital exhaust and event logs to discover and create a digital representation of the business process. Visualization module 112 may use the data generated by the discovery module 111 to create a visualization of the current business process as it happens in an enterprise. This may then be leveraged to check for conformance, optimization and driving transformation for a more efficient process.

For example, in the domain of e-commerce, events from the time a user logs into a system, orders a product and receives a product are logged. The discovery module 111 may view the process and trace the processes from the front end, to the fulfillment center. The discovery module 111 may generate a digital representation of the process and identify the different applications or systems that the process uses. This representation, which in some embodiments can be an end-to-end representation, may be used to detect bottlenecks and alternate routes that the process may take. The representation may also be used in determining compliance of processes and provide audit trails of the process (e.g., for determining compliance).

In some embodiments, discovery module 111 may be automated. The discovery module 111 may access event logs, system logs, application logs, or any log of user activity during the performing a process. The log data may then be fed into a process mining stack or machine learning algorithm to identify the process flow. This mining process may be used in generating the digital representation of the process. One or more algorithms may be used in combination to generate this model.

The identified process may then be visualized for display to an operator of the architecture 100. The digital representation may show the processes involved in the completion of the activity or task and can be played back with historical or custom data. Replaying all the events may allow the operator to watch the process as it is propagated through the enterprise systems. The digital representation may be a process model which may be used to run simulations of the process for generation, validation or other purposes.

The process mining algorithms may include petri nets, process trees, casual nets, state machines, business process model and notation (BPMN) models, declarative models, deep belief networks, Baysian belief networks or other machine learning algorithms. The models generated may also be procedural, declarative or hybrid models. The type of model and algorithm used in generating the model may be determined automatically. Alternatively, the user may provide the model type and algorithm or combination of algorithms to use, as well as adjustments to individual parameters of the algorithms. The process models generated may be used to simulate user activity and system behavior, and provide the data required to the visualization module 112 to generate a visualization of the simulated activity.

Management module 113 may support service delivery via applications and automation tools. In some embodiments, it can also support a marketplace where clients and solution providers can collaborate, share the automation applications and monetize their automation applications built on the architecture 100. With the integration of a marketplace-based ecosystem, the management module 113 may allow enterprises to unlock some of the applications built for them and monetize their investments by selling it on the marketplace for use by other large enterprises.

AI & ML core technology platform 120 may comprise a natural language processing (NLP) module 121, bots module 122, language understanding intelligent service (LUIS) module 123, named-entity recognition (NER) module 124, GraphQL module 125, vision module 126, cognitive search module 127 and optical character recognition (OCR) module 128. The AI & ML core technology platform 120 may use machine learning and AI algorithms such as petri nets, neural networks, deep belief networks, random forest, or other algorithms to tag, label, classify or identify elements from data sources, as well as learn, predict and validate data related to the process being automated. These algorithms may be used in both validation and generation of financial, HR, security, compliance and other enterprise processes. The AI & ML core technology platform 120 may learn to generate reports by training the system on reports that have previously been generated and previous validation processes run on previous reports.

Natural language generation may be employed in the generation of reports. The natural language generation may be trained on domains specific to the process being automated.

NLP module 121 may be configured to read, decipher, understand and make sense of human languages. This may be accomplished by the use of machine learning and artificial intelligence algorithms. NLP module 121 may also generate natural language output. NLP module 121 may further perform syntax operations such as grammar induction, lemmatization, morphological segmentation, part-of-speech tagging, parsing, sentence boundary disambiguation, stemming, word segmentation and terminology extraction. NLP module 121 may further perform semantic operations such as lexical semantics, distributional semantics, machine translation, named entity recognition, natural language generation, natural language understanding, question answering, relationship extraction, sentiment analysis, topic segmentation and recognition and word sense disambiguation. The NLP module 121 may also use the OCR module 128 to perform optical character recognition on text before being analyzed in a natural language understanding process. NER module 124 may also be used to determine proper names and types in the text or speech that is being analyzed by the NLP module 121.

In some embodiments, bots module 122 may include a code free bot development platform that uses a cloud native NLP (natural language processing), conversational AI technologies with several built in services like machine translation, speech to text and text to speech services to simplify automation and offer a conversational user experience. Bots module 122 may use models generated by LUIS module 123 to build natural language understanding into the bots.

GraphQL module 125 may be used to generate queries for APIs and process those queries with existing data. The graphQL module 125 may be used to perform a query that will return predictable results as well as access to referenced information between resources.

Vision module 126 may use computer vision to visually recognize and identify objects, characters, words, graphs, tables, flowcharts, or other visually distinguishable characteristics of an image, video, document or application footprint.

Cognitive search module 127 may use ML and AI to extract relevant information from multiple, diverse data sets. Cognitive search module 127 may use NLP module 121, bots module 122, LUIS module 123, NER module 124, GraphQL module 125, vision module 126 or OCR module 128 to create searchable content in the cognitive search module 127 indexes. Cognitive search module 127 may deliver contextually aware information that is highly relevant to the specific user or system performing the search operation.

For example, the cognitive search module 127 may ingest data in a variety of formats. A user may upload an image, a text document, a spreadsheet, a presentation, a PDF or any other data file. The uploaded data may then be made searchable by performing OCR and indexing the data. After parsing and indexing the data from the document, it is then fed into the NER module 124, where a machine learning algorithm then identifies or classifies elements within the document which are an organization, a person, an entity or other relevant labels such as financial terms. Financial terms that may be identified and classified may include sales, comparable sales (compsales), revenue, expenses, or profit, and for identified elements there can be an additional validation process. During this validation process the system may connect to data sources and extract data corresponding to the identified elements, such as revenue. Additional supportive documents may also be uploaded for this validation process. For example, if someone has a report that they generated that supports the revenue, they would upload it and mark it as a supporting document. Then the system may match it and provide a successful validation of the element.

Automation platform 130 may comprise an operation module 131, automation module 132 and optimization module 133. The automation platform 130 may implement intelligent automation for foundational services like infrastructure operations, security and other operational activities for systems, databases and application administration that span on-premise and multi cloud deployments. The automation platform 130 may leverage the machine learning models generated by the AI & ML core technology platform 120, to deliver intelligent automation for complex processes in specific business domains like finance, enterprise security, governance risk and compliance (GRC), HR and other enterprise business activities. Machine learning and AI components may be built and trained for domain-specific cognitive skills.

Intelligent automation applications 135 may include modules for automating domain-specific processes. These modules may comprise a finance module 136, security module 137, HR module 138, and modules for other domains within the enterprise environment. The intelligent automation applications 135 may incorporate the machine learning and AI components created by the automation platform 130 to handle automation of complicated enterprise processes. To handle the automation of enterprise processes, modules are configured to automate domain-specific activities and tasks. The modules are built and trained to intelligently automate activities and tasks in the domains of finance, security, HR and GRC. The finance module 136, security module 137 and HR module 138 may all be trained separately and on data sets that are specific to the domain being automated.

The machine learning and AI components that make up the domain-specific modules in the intelligent automation applications 135 may be used to deliver enterprise automation in a scalable way. By implementing machine learning and AI within the domain-specific modules, the intelligent automation applications 135 are able to deliver automation at scale to handle rapidly changing business processes. By using machine learning and AI, a solution can be built once and adapted to serve multiple domains and customers at scale.

Finance module 136 may be configured to automate a large number of financial activities and tasks. For example, an instance of the finance module 136 may be run by a bot and configured to generate and/or validate earnings reports.

The bot may receive an earnings report document which is to be validated. The bot may then read the report and recognize elements within the report. The elements recognized by the bot may be terms specific to the domain. In this case, the terms would be finance terms. The bot may identify and recognize financial terms such as profit and loss (PnL), assets, depreciation, revenue, sales, comparable sales, as well as other related terms. The recognition and understanding of the earnings report may be performed by a combination of computer vision, OCR, NLP and other machine learning models. The understanding of the earnings report may also incorporate the analysis of extracted language, terms, fields and values, as well as the organization of the language, terms, fields and values, recognized in the earnings report.

Once the earnings report has been ingested, the bot may search for documentation to support the facts in the earnings report. This fact checking may require access to many additional documents, systems, and databases. The bot may determine that specific documentation is missing from the system and require a supporting document to be uploaded by a user. The bot may also access systems within an enterprise as well as systems on external networks. Queries may be run by the bot on the accessed systems to retrieve information that is to be used in the validation of the earnings reports.

The validation may be initiated by a natural language interface, where the user asks the system to perform the validation. LUIS module 123 may be used to create chat bots that interface with cognitive search module 127 and graphQL module 125 to execute commands issued by the user.

The results of the earnings report validation may be visually displayed through a web-based interface. The results may also be provided to the user in the form of stored documents and images that may be accessed or downloaded, displayed on a mobile application, a standalone desktop application, or other platforms capable of displaying the validation results. The validation results may visually distinguish successfully validated elements, such as by highlighting the element in green. The elements that are found to be errors may be highlighted red, as well as displaying the discrepancy that lead to the error determination. When performing the validation, a confidence value may be determined for individual elements based on supporting documents. Elements with a confidence level above a predefined threshold may be classified as successfully validated. Elements with a confidence level below a second predefined threshold may be classified as errors. When the confidence level of an element does not exceed either threshold (e.g., a value between the first and second predefined threshold values), the undetermined element may be marked and/or highlighted (e.g., yellow) and a user may be prompted to indicate if the element value should be marked as an error. An undetermined element may also occur when the element has been newly introduced to the report. In such a case, the validation bot may have no understanding of the element and may require addition training to learn to validate the element.

Generation of an earnings report is performed in a similar fashion to that of the validation of the earnings report. The bot may access financial systems within an enterprise and/or on external networks, as well as query databases and financial platforms. Communication may be accomplished through the use of API calls for the different systems and platforms being accessed. The earnings report generation bot would access the same data that the validation bot accessed. When a user runs the report generation bot, some of the parameters can be identical or similar to those parameters accessed by the validation bot. The report generation bot may also allow for the user to specify the sentiment of the report, such as whether the report is forward looking, a long-term forecast, or related to performance of previous time periods.

Additionally, an instance of finance module 136 may be run by a bot and configured to validate invoices. Invoices may be uploaded as images or documents, then read by the bot. The values extracted from the invoice may then be compared to threshold values or other metrics to determine approval or denial of the invoice.

When an image or document is uploaded or retrieved, a bot may use computer vision, OCR, NER and NLP to recognizes the type of document that is being processed. When the determination is that the image or document is an invoice, the bot may identify tables, line items, quantities, costs, subtotals and tax. The bot may also extract vendor or supplier, associate line items with products or services, and check the quantity and costs of the line items with the corresponding purchase order. Recognition may be performed on invoices of any format. Different vendors and suppliers may use different invoice formats, and when adding a new vendor or supplier with a new invoice format, the bot may recognize the document as an invoice without needing to retrain the bot to incorporate a new invoice format. By contrast, existing automation systems may have to generate or retrain an automation tool when changes are introduced in their input data.

The described processes, including the process of discovery, training machine learning models and executing intelligent automation applications 135 based on those models can be adaptable to multiple domains and are not limited to financial domains. For other domains, event and system logs may be analyzed and mined to generate digital representation of business processes and business process models may be learned from this data. Different domains may identify and classify domain-specific elements in the ingested documents. APIs may be used to communicate with systems, application and hardware that are used in the activities and tasks that correspond to the activity logs. Multiple domains may be used in the training of a single business process model. Multiple business process models from different domains may be used in combination when performing validation or generation processes for hybrid applications that span more than one domain.

Security module 137 may ingest data relating to security policies, firewall rules, access logs, IP address data, malware or virus databases, or any other security related information. The security module would be trained in a similar manner as the other intelligent automation applications 135.

HR module 138 may be used to automate repetitive and time-consuming tasks such as posting job listing for open positions, updating the listings and removing listings of vacancies that have already been filled. In industries where employee turnover is high, a large amount of man hours would be needed to constantly update, refresh, remove or list new position openings. HR module 138 may also intelligently automate the listing of open positions in different regional locations based on seasonal trends, turnover, or other factors such as increased sales or expansion.

Additional intelligent automation applications 135 may be added to the modules already present by training additional components on previously generated modules. This reduces the time needed to train and generate a new module for new domains.

The execution of the intelligent automation applications 135 may be used in a closed loop or feedback loop with the discovery platform 110 and the automation platform 130. The discovery platform 110 may use the event and system logs, audit trails, input and output data from the execution of the intelligent automation applications 135 to generate new updated digital representations of the business process. The business process may then be analyzed to determine if there was improvement in the efficiency of the business process, and the optimization module 133 may then adjust the model to further improve the performance of the business process.

A marketplace for trained business process models and intelligent automation applications 135 may be used by companies to buy models and applications that were previously created by others, or to sell models and applications that were developed for them. Building automation applications can demand substantial resources to be invested by an enterprise. By allowing for the automation applications and models to be sold in a marketplace, some of the cost of the development may be recouped by the enterprise. The marketplace may also allow for packages, automation application and models created by the host of the platform to distribute updates and new features to enterprises that are already using the system. The marketplace may be cloud-based and allow for the delivery of software digitally.

Figure 2:
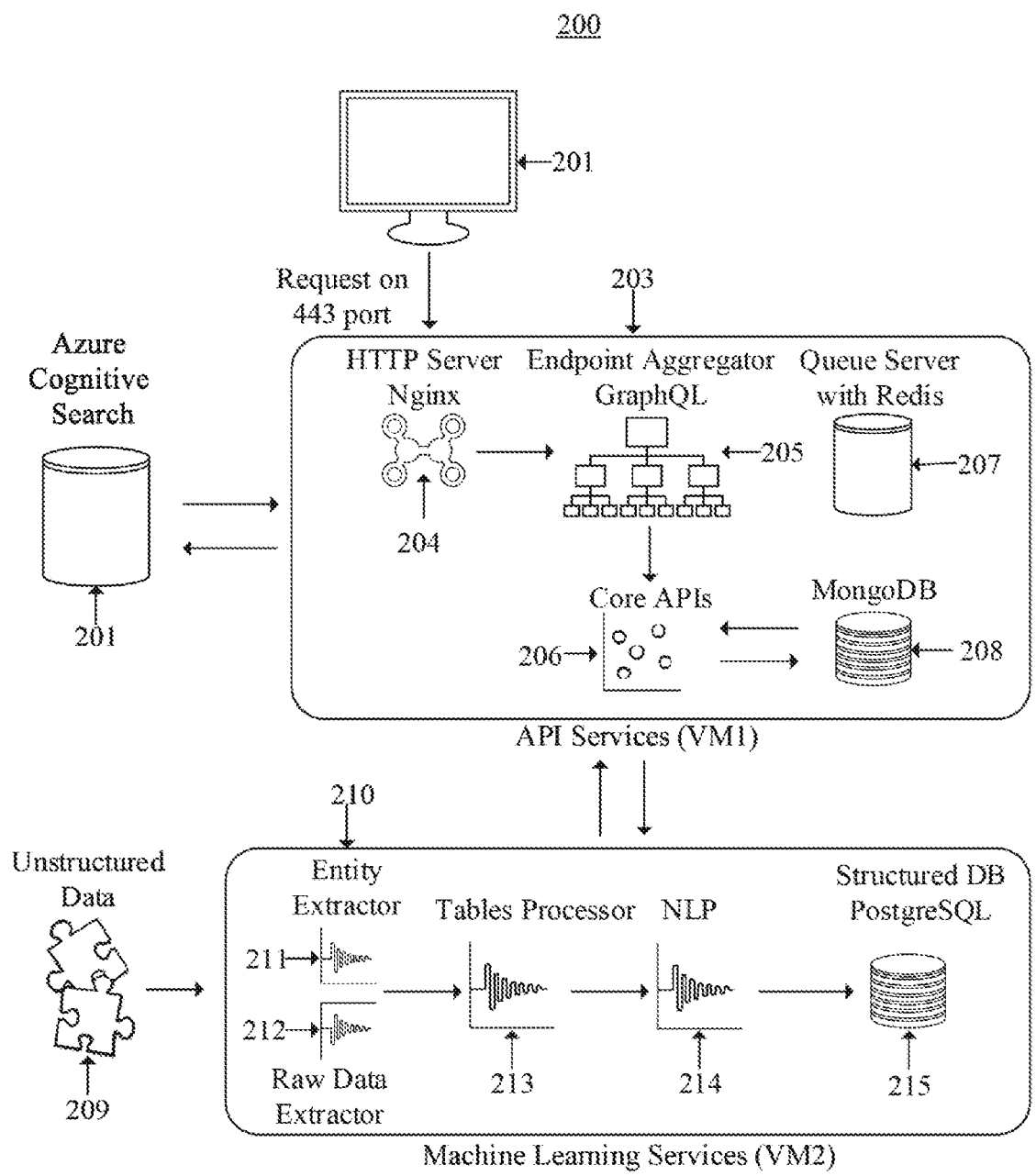
FIG. 2 illustrates an example of a financial service architecture in accordance with aspects of the present disclosure.

FIG. 2 illustrates an example of financial service architecture 200 in accordance with aspects of the present disclosure. Financial service architecture 200 may comprise client device 201, cognitive search 202, API services 203, HTTP server 204, endpoint aggregator 205, core APIs 206, queue server 207, MongoDB 208, unstructured data 209, ML services 210, entity extractor 211, raw data extractor 212, table processor 213, NLP 214 and structured database 215. Financial service architecture 200 may be an example implementation of finance module 136.

Client device 201 may be a desktop computer, laptop, personal digital assistant, tablet, smart phone, or other computing devices capable of connecting with the financial service architecture 200.

Cognitive search 202 may receive documents, images or other unstructured data for processing. The processing may include the parsing and indexing of the documents and their content. Cognitive search 202 may receive user commands, both natural language commands and input from input devices such as mice and keyboards. The user may request a keyword and/or proximity search on the data that has been processed by cognitive search 202. Cognitive search 202 may receive queries, commands, documents and images with attached AI skills. For example, a user may use a free text input field to enter a query to return the revenue for a department for a specified period. Cognitive search 202 may recognize the keyword revenue, and the date ranges or quarters entered, and associate revenue with invoices. Cognitive search may then return and aggregate elements from the invoices queried and return a visualization of the results of the generated revenue report.

API services 203 may comprise HTTP server 204, endpoint aggregator 205, core APIs 206, queue server 207 and MongoDB 208. API services 203 may be implemented as a web application that provides input functionality to the user as well as generating and displaying visual representations of reports, business processes, search queries and other data. Endpoint aggregator 205 may return documents based upon user search queries from multiple data sources. In one embodiment, when a user searches for sales, endpoint aggregator 205 may return multiple documents that were previously indexed and included sales. The user would be able to pick one of the returned documents and request validation of the document. Core APIs 206 may then call the machine learning services 210, requesting validation documents for sales and providing variables needed for the identification of the requested documentation.

Queue server 207 may be used to schedule the processing of elements to be validated. For example, when performing a validation on an earnings report, there may be more than 5000 different elements that must be validated. The processing of such a large number of elements may take many hours. The queue server 207 may be used to ensure that elements are processed and validated in the proper order (e.g., based on when they were added to the server). The processing is performed through calls to the ML services 210, and once completed, the entry is popped out of the queue. This processing may be performed asynchronously.

MongoDB 208 may be used as an internal data store. Information regarding which user submitted which document and information about the processes may be stored. The MongoDB 208 may store information relating to execution times, validation percentage, and error rates.

Unstructured data 209 may be in the form of images, documents, or data streams. The unstructured data 209 may be input into ML services 210. Entity extractor 211 and raw data extractor 212 may use computer vision and machine learning algorithms to extract elements such as entities and topics. Table processor 213 may be used to extract tables and nested elements from the unstructured data. NLP 214 may detect and understand the natural language portions of the unstructured data. NLP 214 may use computer vision and OCR to parse the document before being analyzed to identify entities. Multiple machine learning algorithms may be used individually or in combination to perform the extractions in the entity extractor 211, raw data extractor 212, table processor 213 and NLP 214. Structured database 215 may then store the extracted information from the processing of the unstructured data in a structured manner. ML services 210 may be domain-specific and trained on data relating to that domain.

Figure 3:
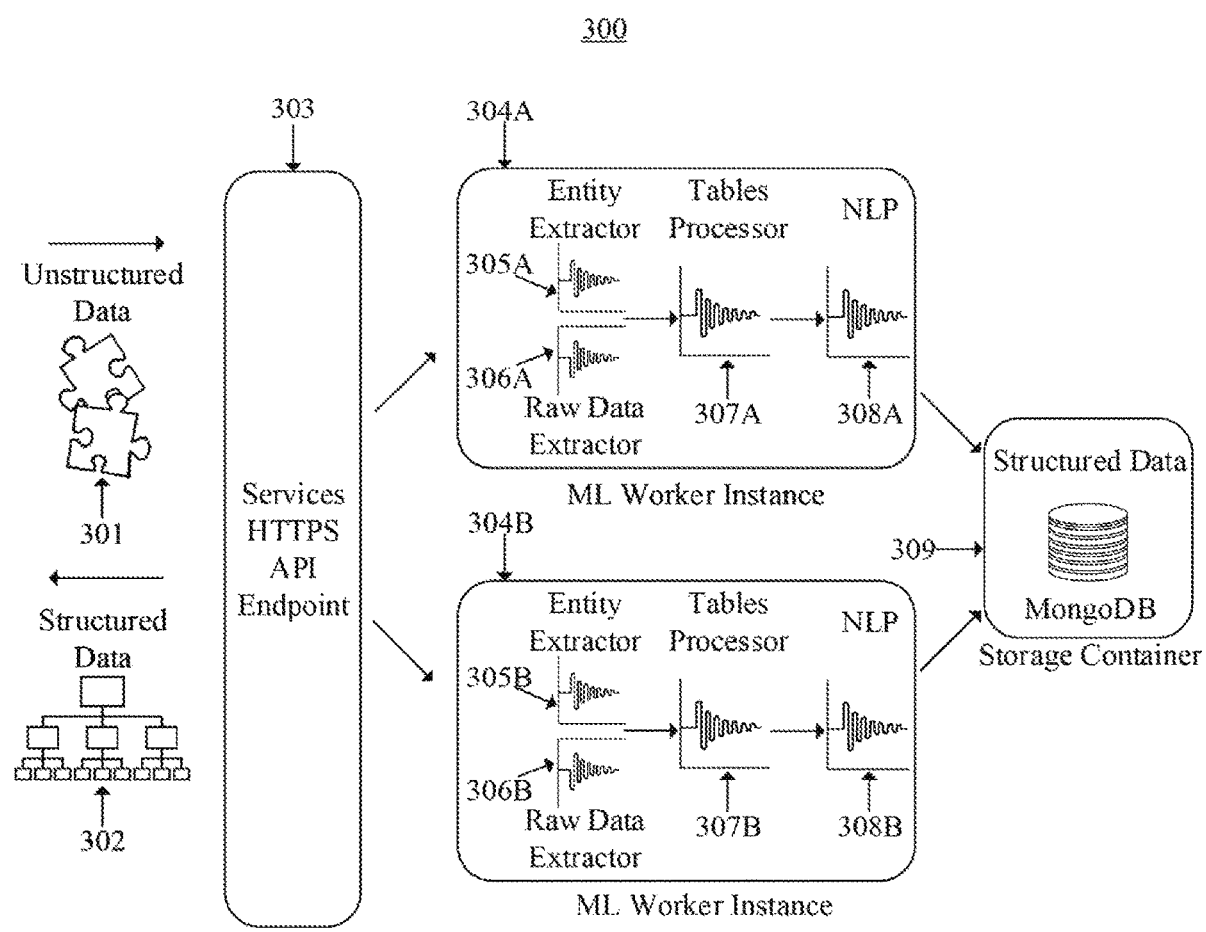
FIG. 3 illustrates an example of a machine learning architecture in accordance with aspects of the present disclosure.

FIG. 3 illustrates an example of a financial machine learning architecture 300 in accordance with aspects of the present disclosure. Financial machine learning architecture 300 may receive unstructured data 301, and output structured data 302. The financial machine learning architecture 300 can further include Service HTTPS API endpoint 303, ML worker instances 304A and 304B, entity extractors 305A and 305B, raw data extractors 306A and 306B, table processors 307A and 307B, NLPs 308A and 308B, and storage container 309. Financial machine learning architecture 300 may be an example implementation of ML services 210.

Unstructured data 301 may comprise the same or similar data as unstructured data 209. Structured data 302 may comprise processed unstructured data. Service HTTPS API endpoint 303 may facilitate communication between cognitive search 202, API services 203 and ML services 210. ML worker instances 304A and 304B may be instances of the same module or instances of separate and unique modules. ML worker instances 304A and 304B may be trained on data from the same domain or different domains. The number of ML worker instances may be variable and increased to accommodate larger tasks or to increase performance. By allowing for the parallel execution of multiple ML worker instances, the platform may scale to meet the changing demands of the enterprise. Entity extractors 305A and 305B, raw data extractors 306A and 306B, table processors 307A and 307B and NLPs 308A and 308B are similar to those discussed with regard to FIG. 2. Storage container 309 may be any structured database, such as MongoDB.

Figure 4:
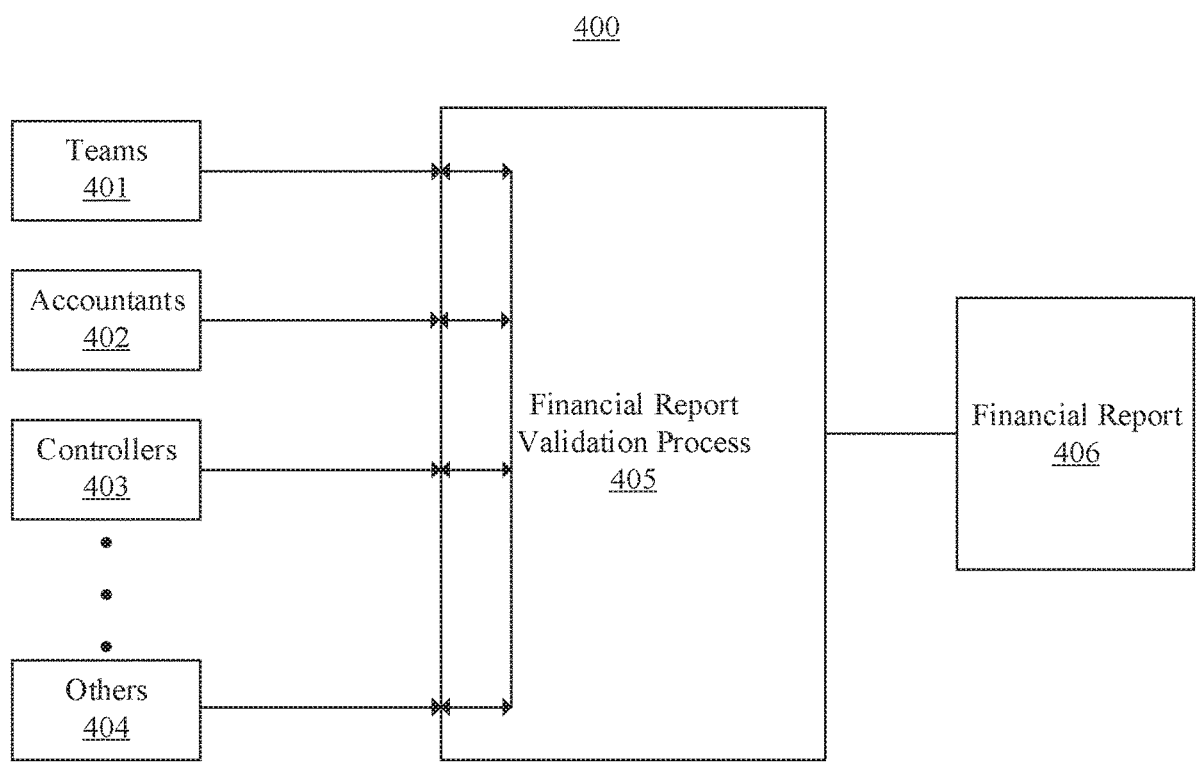
FIG. 4 illustrates an example of a system for validating financial reports.

FIG. 4 illustrates an example of a system for validating financial reports 400. The system for validating financial reports 400 may comprise teams 401, accountants 402, controllers 403, others 404, a financial report validation process 405 and financial report 406.

At multiple business location, teams 401, accountants 402, controllers 403 and others 404 may be employed for the purpose of generating and validating a financial report 406. The financial report validation process 405 may require large numbers of people performing the same or similar tasks across an enterprise. The financial report validation process 405 may take weeks to months to complete. For example, teams 401 may have to provide their financial documents to the accountants 402. The accountants 402 generate various financial reports based on the input received from the teams 401. These financial reports can include revenue reports, sales reports, expense reports and other financial reports. These financial reports can also be the basis for the earnings report of the enterprise deploying the system 400. Controllers 403 validate the financial reports and/or the earnings reports generated by the accountants 402 and flag discrepancies and check the financial reports against various enterprise and regulatory compliance regimes.

Using the described embodiments, the system 400 can be more efficiently automated. For example, some or all functions of accountants 402 and controllers 403 can be replaced by or augmented with the described embodiments. Additionally, the automation according to the described embodiments, can substantially reduce the number of errors in the final financial report 406.

Figure 5:
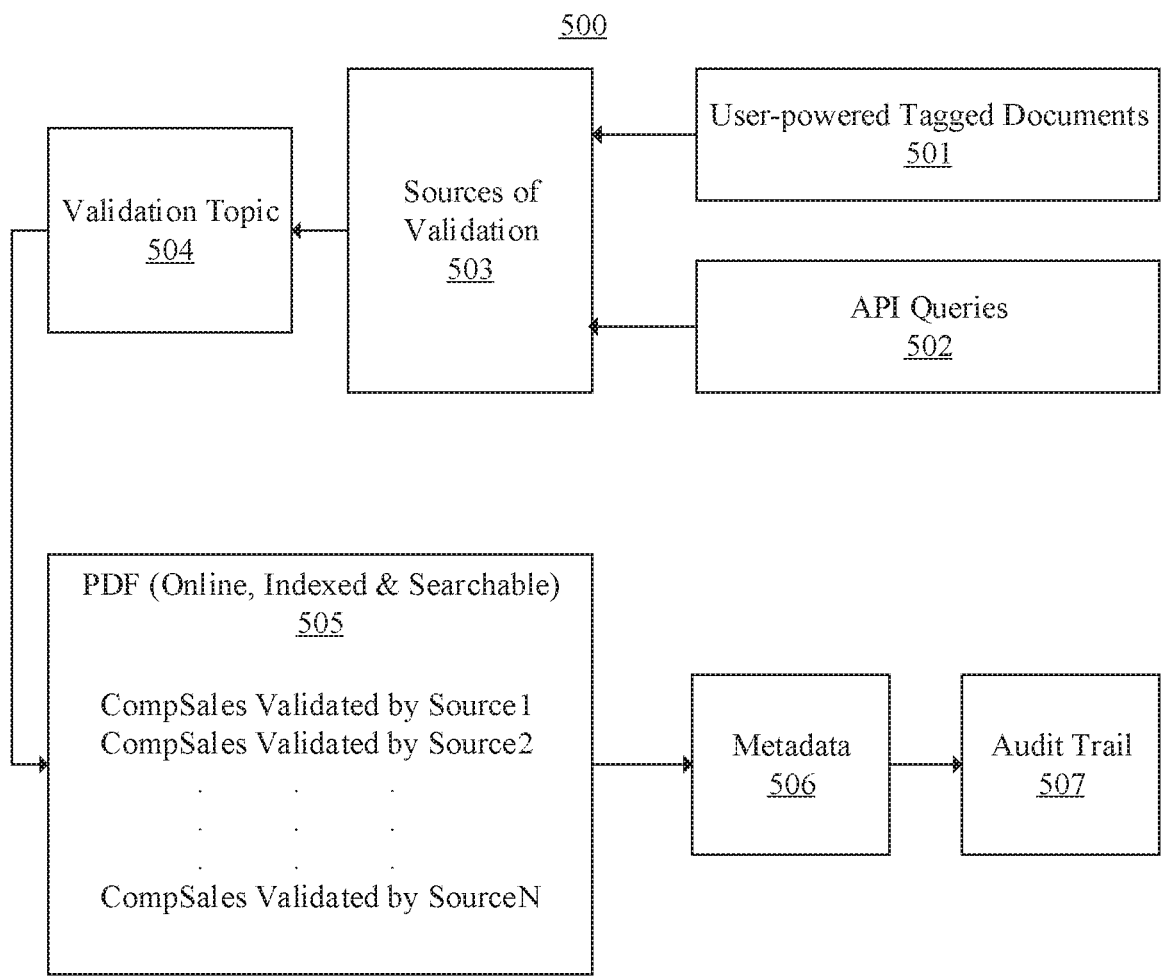
FIG. 5 illustrates an example of a system for validating financial reports in accordance with aspects of the present disclosure.

FIG. 5 illustrates an example of a system for validating financial reports 500 in accordance with aspects of the present disclosure. The system for validating financial reports 500 may comprise user-powered tagged documents 501, API queries 502, sources of validation 503, validation topic 504, pdf (online, indexed & searchable) 505, metadata 506 and audit trail 507. The PDF 505 can be an example of a financial report generated according to the described embodiments.

User-powered tagged documents 501 may be any document or image supplied by a user, API, system or application. API queries 502 may serve as the communication between different modules, processes or models used in the processing of reports. Both user-powered tagged documents 501 and API queries 502 can be used as sources of validation 503. Additionally, sources of validation 503 may include data from systems, databases and applications within the enterprise, data on outside networks or data on a cloud infrastructure. Validation topic 504 may be extracted from the user-powered tagged documents 501, API queries 502, sources of validation 503 or supplied as separate user input. The validation topic 504 may be used in determining the actions to take on the data collected or provided. PDF 505 may be a financial report along with a validation report that is generated to disclose the sources and values used in the validation process. The validation process may generate large amounts of metadata 506, which may be stored along with a detailed accounting of sources accessed, date and time accessed, validation status of each element, and other details required to create and store an audit trail 507. The audit trail 507 can include a history of sources and data used to arrive at a validation assessment. The audit trail 507 can be a visual report superimposed on the PDF 505, or it can be a separate data structure. In some embodiments, the audit trail 507 can be queried independently or in combination with the PDF 505. The PDF 505 can be implemented in other formats as well.

Figure 6:
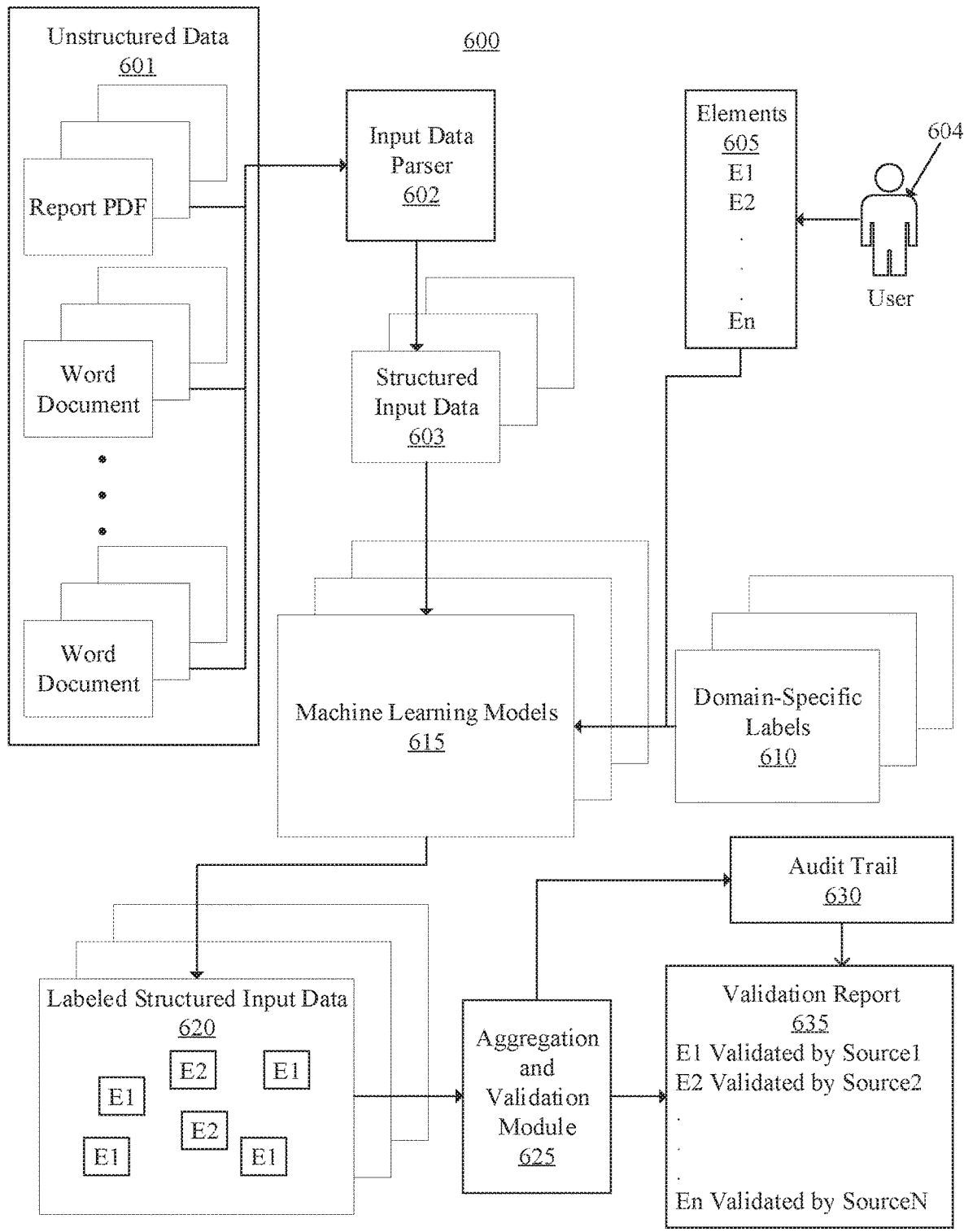
FIG. 6 illustrates an example of an automation system in accordance with aspects of the present disclosure.

FIG. 6 illustrates an example of an automation system 600 in accordance with aspects of the present disclosure. The automation system 600 may receive unstructured data 601, and use an input data parser 602 to generate structured input data 603. A user 604, can provide one or more validation documents 605. The validation documents 605 can include one or more elements E # that are relevant to a validation topic or category, which can also be received from the user 604 (for example, the user 604 can tag the validation documents 605 with a validation topic or category, such as "revenue," "sales," etc.).

Unstructured data 601 may be the same or similar to unstructured data 301 in FIG. 3. Referring to FIG. 1, and as an example, the unstructured data 601 can be collected from existing applications by business domain 105 or received from one or more users of the architecture 100. In one embodiment, the received unstructured data 601 may be data relevant to validating a financial report such as an earnings report. The input data parser 602 may receive, parse and index the unstructured data 601, transforming it into searchable structured input data 603. The structured input data 603 may then be passed to the machine learning models 615 to be further processed.

Machine learning models 615 can be trained with domain-specific labels 610 to be able to identify and label the domain-specific labels 610 in structured input data 603 and output labeled structured input data 620. In some embodiments, the domain-specific elements 610 can be elements E #s that may be found in validation documents 605. Machine learning models 615 may receive the structured input data 603, and label relevant portions of the structured input data 603 with the domain-specific labels 610 (which can include elements E #). The list of elements E #s can be relevant to one or more categories that are to be validated. As an example, one or more machine learning models 615 can be trained to identify, in the structured input data 603, a plurality of elements (E #) relevant to "revenue" category of an earnings report. Example E # relevant to the "revenue" category of an earnings report can include sales tables, expense tables, etc. Other domain-specific labels 610, where the domain is validation or generation of financial reports, can include items such as profit and loss statements, assets, depreciation schedules, revenue items, sales figures and others.

Domain-specific labels 610 may belong to one or more categories relevant to validation or generation of a financial report, such as an earnings report. In some embodiments, the validation documents 605 can be initially tagged by the user 604 with one or more relevant validation categories, so the machine learning models 615 can determine which set of domain-specific elements E # to look for and identify in the structured input data 603. In other embodiments, the categories can be preconfigured in the automation system 600 based on the domain to which the domain-specific labels 610 belong. As described, configuring the automation tools, in some embodiments, may include training machine learning tools to label portions of the structured input data 603 with categories and elements relevant to validation of a financial report or other tasks as may be applicable in the context of the environment or domain in which the automation system 600 is deployed. In the context of validating financial reports, the trained machine learning tools (e.g., the machine learning models 615) may receive a validation document 605 (e.g., a financial report) tagged with a relevant validation category (e.g., "revenue"). The machine learning models 615 can determine which domain-specific labels 610 correspond to the validation category of the received validation document 605. The trained machine learning models 615 can identify and tag portions of the structured input data 603 that correspond to, are relevant with or can otherwise support validating the validation document 605 in the tagged validation category.

In the example shown in FIG. 6, the elements E # are found in the validation document 605 and are relevant to a validation category indicated by the user 604. Domain-specific labels 610 corresponding to elements E # are also identified and used to train the machine learning models 615. The trained machine learning models 615 are used to identify and label relevant portions of the structured input data 603 with the labels E #. As described earlier, the underlying structured input data 603 corresponding to labels E # can relate to or in turn correspond to, support, validate or negate one or more elements E # in the validation document 605.

An aggregation and validation module (AVM) 625 can aggregate, combine and otherwise compile various sources of validation for an element E # from the labeled structured input data 620. For example, a plurality of "profit and loss statements" from various sources (e.g., various documents) within an enterprise organization may contribute to the "revenue" element of an earnings report, when the earnings report is the validation document 605. The AVM 625 uses the labels in the labeled structured input data 620 to find and combine the sources contributing to the same element. The aggregation and validation module 625 can then compare the aggregated and combined elements with the element in the validation document 605, in order to validate the information reported in the validation document.

In the example of validating an earnings report, the user 604 can submit, to the automation system 600, an earnings report as the validation document 605 and tag it as "an earnings report to be validated." A plurality of elements E # corresponding to the validation document 605 can be identified in the domain-specific labels 610 (e.g., E1="revenue"). In some embodiments, the user 604 can also provide a plurality of additional documents that may be relevant to validating the validation document 605. For example, the user can provide a plurality of documents tagged as "revenue" or "profit and loss". Trained machine learning models 615 can receive these documents, as well as structured input data 603 and can find and label input data corresponding to the identified domain-specific labels. For example, the machine learning models 615 can find and label E1 elements, relevant to the "revenue" element of the validation document 605, as well as other elements E # found in the validation document 605 and identified in domain-specific labels 610. As a result, the machine learning models 615 can generate labeled structured input data 620, which is searchable and indexed, for example according to the labeled E # found in the validation document 605 and the identified domain-specific labels 610. The AVM 625 can use the labeled, structured input data to aggregate and combine elements found in the validation document 605. For example, the AVM 625 can aggregate and combine the revenue elements E1, expense elements E2, asset elements E3, and so forth. The AVM 625 can compare the aggregated and combined figures with those reported in the validation document 605 and determine whether the reported figure matches the aggregated and combined elements. If there is a match, the reported figure is validated. If there is not a match, the reported figure is marked as failed validation. Various validation thresholds depending on the desired tolerances of validation can be programmed in the automation system 600 to determine successful and failed validations.

The AVM 625 can also generate an audit trail 630 through tracking and recording of the sources of the validation data, and other information useful in maintaining verifiable proof of compliance. The AVM 625 can use the searchability, indexes and the labels in the labeled structured input data 620 to construct the audit trail 630. For example, for E1, "revenue" element, the AVM 625 can track the sources of validation (e.g., sales reports from a plurality of branches, departments, stores, etc.). Additionally, the AVM 625 can generate a validation report 635. In some embodiments, the validation report 635 may be generated and displayed by the regeneration of the validation document 605 (e.g., received financial report) along with visual elements indicating result of the validating. In other embodiments, the validation report 635 can be a separate document or in a variety of formats (such as web browser page, charts, PDFs, Excel sheets, spreadsheets) or any other machine or human readable format.

Figure 7:
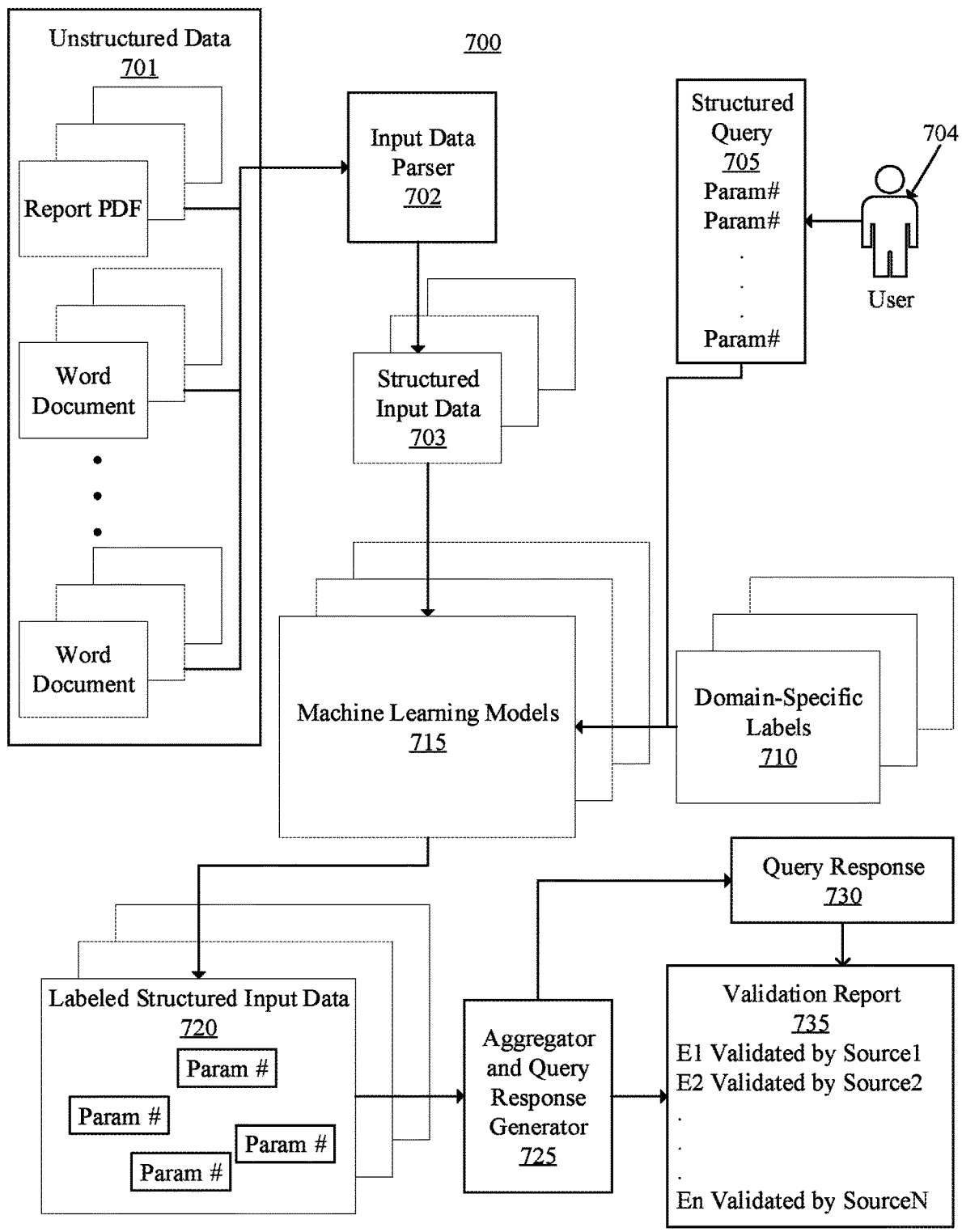
FIG. 7 illustrates an example of an automation system for receiving a structured query and generating a query response in accordance with aspects of the present disclosure.

FIG. 7 illustrates an example of an automation system 700 for receiving a structured query 705 and generating a query response 735 in accordance with aspects of the present disclosure. The automation system 700 can operate similarly to the automation system 600 and can include components or data, such as unstructured data 701, input data parser 702, structured input data 703, domain-specific labels 710, machine learning models 715, labeled structured input data 720, aggregator and query response generator (AQRG) 725, and audit trail 730.

In the automation system 700, the automation tools may be machine learning models 715 trained to label portions of the structured input data 703 with categories relevant to a response to the structured query 705. The structured query 705 can include one or more labels, or parameters, such as param #. In one embodiment, the automation system 700 can be deployed in the financial industry to, for example, generate automatic responses to queries for various purposes. The searchable and indexed structured input data 703 can be generated in the same manner and from the plurality of sources as may be applicable for an enterprise and for example, similar to how the structured input data 603 is generated. An example of a structured query 705 can be, Q=(param1, param2), where Q, the response to query is compsale, param1 is a beginning of a financial period and param2 is the end of a financial period contributing to the compsale (compsale_query=FiscalYr #QT #, FiscalYr #QT #).

The automation system 700 can identify domain-specific labels 710 corresponding to param #s and relevant to the query response 735. Machine learning models 715 can be trained to find and label portions of the structured input data 703 which contain underlying data corresponding to the identified domain-specific labels 710. The underlying data can be used to generate the query response 735. The AQRG 725 can aggregate and combine labeled elements having the same label and use those aggregated and combined elements to generate the query response 735.

In the example, compsale_query=(fiscalyr2019QT1, fiscalyr2019QT3), domain-specific labels 710 corresponding to response to this query are identified. These can include param1=department#_retail_revenue (fiscalyr2019QT1, fiscalyr2019QT3), param2=department#_online_revenue (fiscalyr2019QT1, fiscalyr2019QT3) and so forth. The machine learning models 715 can label the structured input data 703 with instances and elements relevant to the identified domain-specific labels (e.g., param1, param2, etc.) response to this query. Examples can include sales figures from various departments found in reports, PDF documents, emails, Word documents or other sources. The machine learning models 715 can output a labeled structured input data 720 that are searchable and indexable, including with the identified domain-specific labels 710 (e.g., param #s). The AQRG 725 can aggregate and combine underlying data corresponding to the same labels to generate the query response 735 and audit trail 730 in a similar manner as described above in relation to the automation system 600. In some embodiments, query response 735 may be displayed to a user along with a visual representation of the audit trail 730.

Figure 8:
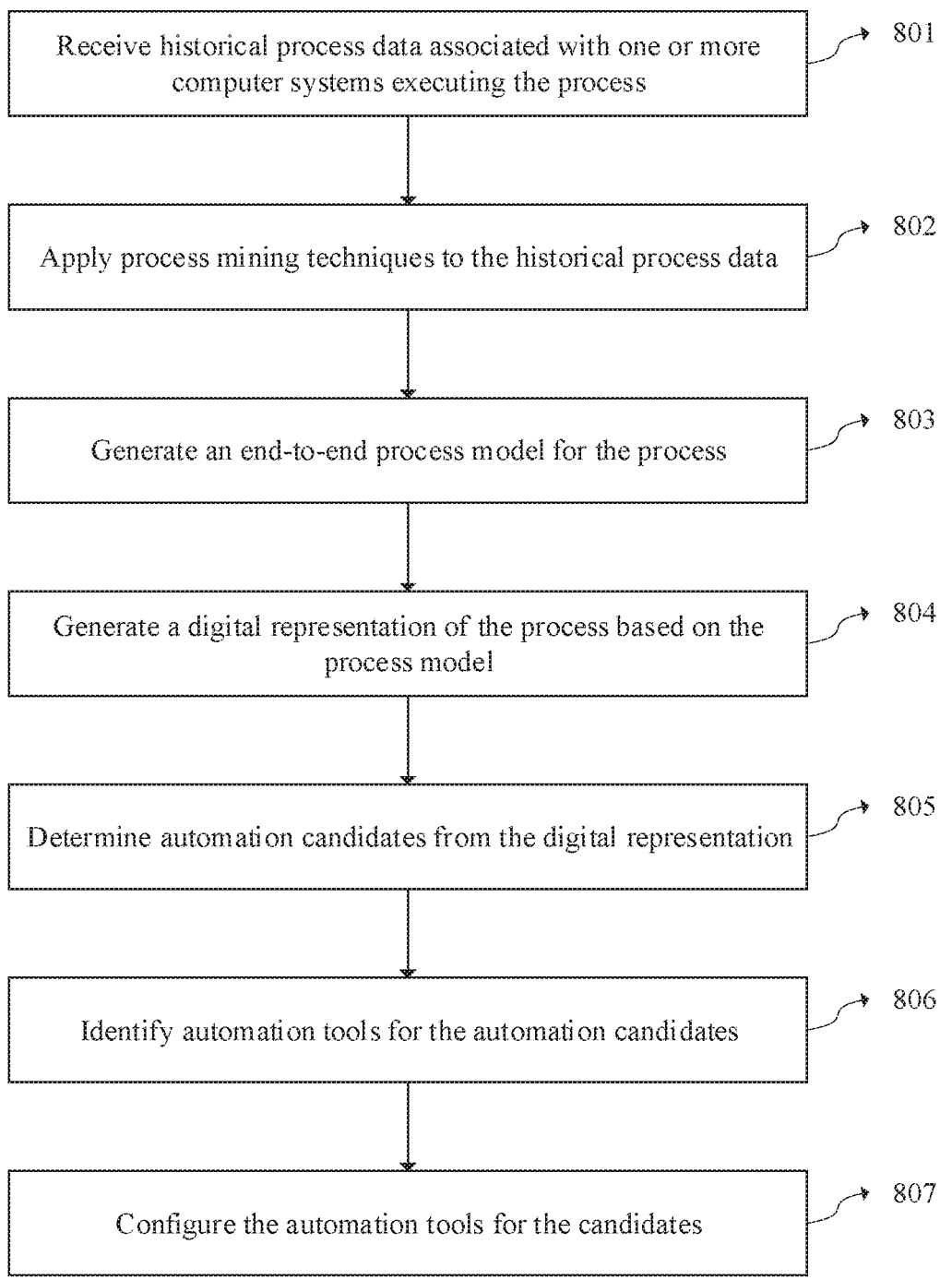
FIG. 8 illustrates an example of a method for generating process models and configuring automation tools in accordance with aspects of the present disclosure.

FIG. 8 illustrates an example of a method 800 for generating process models and configuring automation tools in accordance with aspects of the present disclosure.

At step 801, the method includes receiving historical process data associated with one or more computer systems executing the process. The historical process data may be unstructured documents or images. The historical process data may also include event logs, system logs, and other data related to the process being performed.

At step 802, the method includes applying process mining techniques to the historical process data. The process mining techniques may include one or more machine learning algorithms designed to identify business processes and their workflows. These machine learning algorithms may include petri nets, process trees, casual nets, state machines, BPMN models, declarative models, deep belief networks, Baysian belief networks or other machine learning models.

At step 803, the method includes generating an end-to-end process model for the process. The identified process and generated process model may be used to further analyze business processes and their inefficiencies.

At step 804, the method includes generating a digital representation of the process based on the process model. The digital representation may allow for the process to be replayed visually to give the user a better understanding of the entire process from beginning to end. This may visually highlight bottlenecks in the process.

At step 805, the method includes determining automation candidates from the digital representation. The candidates may be portions of the process that require manual interaction with a system or bottlenecks due to other circumstances. Automation candidates may be scored or ranked based on many performance metrics such as expected accuracy improvement, reduction in processing time and increased process throughput.

At step 806, the method includes identifying automation tools for the automation candidates. Each activity, task or event in the business process may be automatable in different ways. The system may determine which machine learning tool would be best to train and execute in the automation of the business process. Multiple machine learning tools may also be used individually or in combination.

At step 807, the method includes configuring the automation tools for the candidates by training the machine learning tools on domain-specific data.

Figure 9:
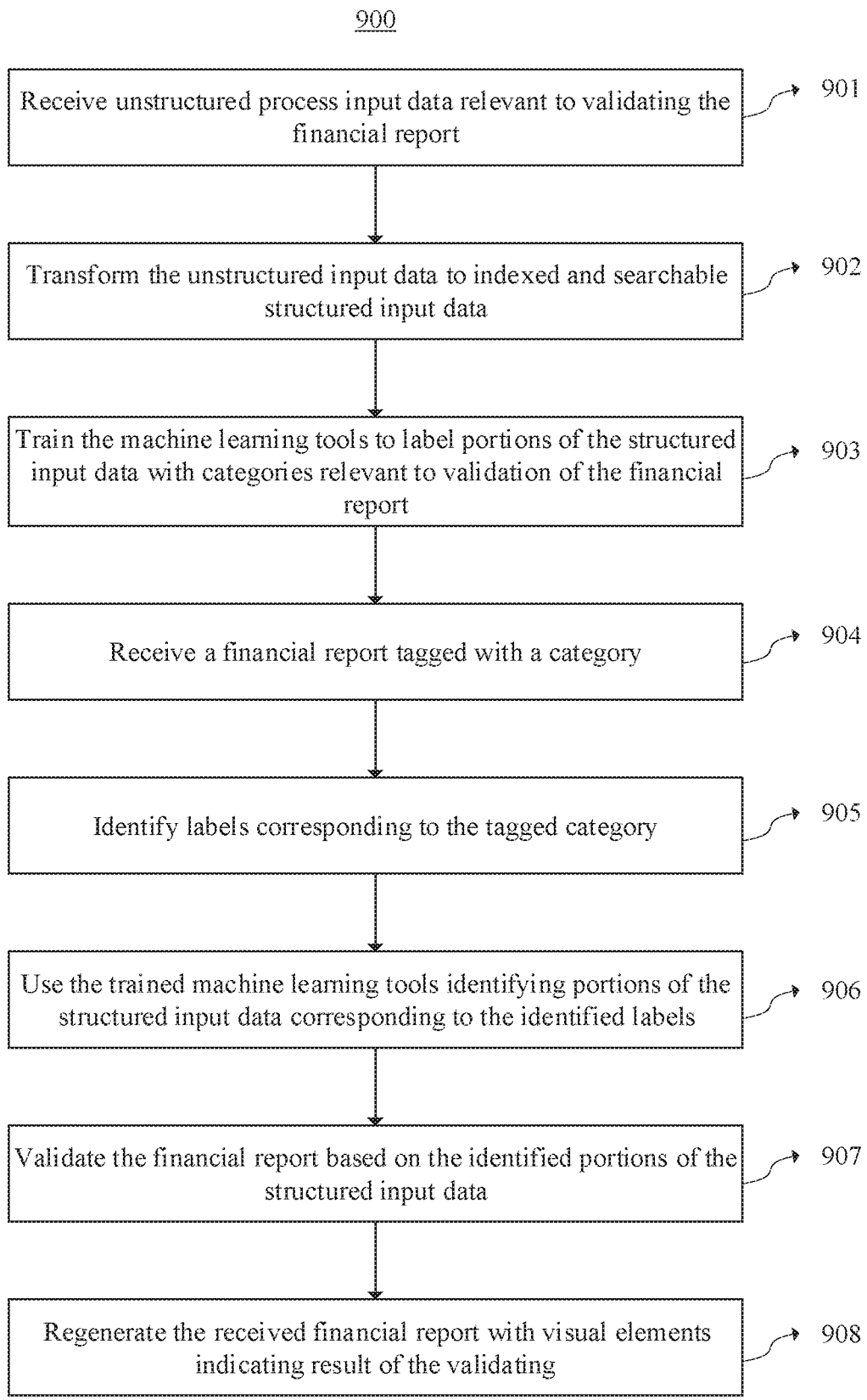
FIG. 9 illustrates an example of a method for validating financial reports in accordance with aspects of the present disclosure.

FIG. 9 illustrates a method 900 for validating financial reports in accordance with aspects of the present disclosure. The method 900 corresponds to the embodiment of the automation system 600 of FIG. 6.

At step 901, the automation system 600 may receive unstructured process input data relevant to validating the financial report. This data may be the unstructured data 601 of FIG. 6. The data may be received by input data parser 602.

At step 902, input data parser 602 may transform the unstructured input data to indexed and searchable structured input data.

At step 903, the automation system 600 may train the machine learning tools to label portions of the structured input data with categories relevant to validation of the financial report. The machine learning tools may correspond to machine learning models 615.

At step 904, the automation system 600 may receive a financial report tagged with a category.

At step 905, the automation system 600 may identify labels corresponding to the tagged category.

At step 906, the automation system 600 may use the trained machine learning tools to identify portions of the structured input data corresponding to the identified labels.

At step 907, the automation system 600 may validate the financial report based on the identified portions of the structured input data.

At step 908, the automation system 600 may regenerate the received financial report with visual elements indicating result of the validating. This validation report may indicate the sources of the validation information as well as the results. An audit trail may also be generated and recorded for the validation process.

Figure 10:
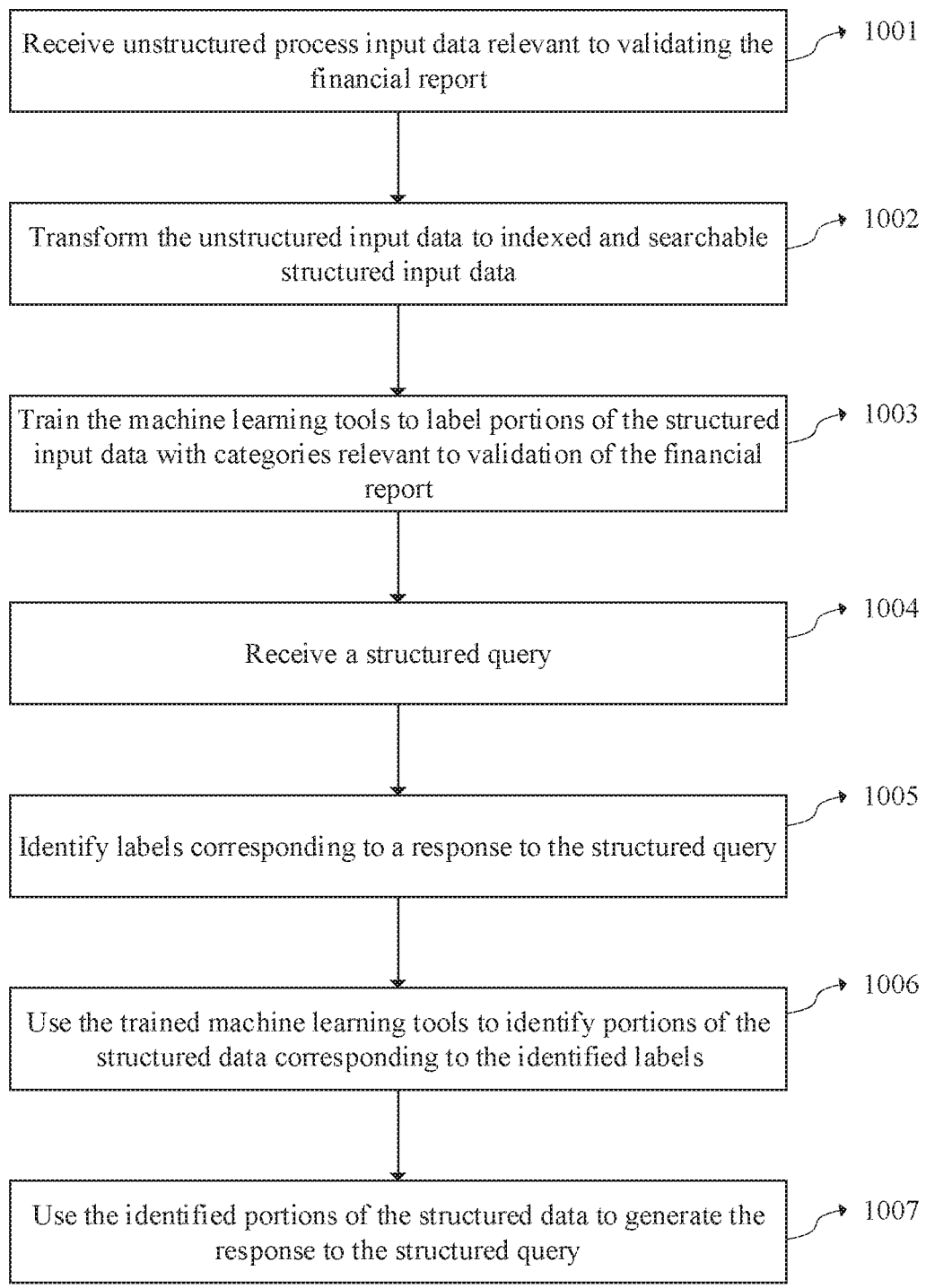
FIG. 10 illustrates a method for receiving a structured query and generating a response to the structured query in accordance with aspects of the present disclosure.

FIG. 10 illustrates a method 1000 for receiving a structured query and generating a response to the structured query in accordance with aspects of the present disclosure. The method 1000 corresponds to the automation system 700 of FIG. 7.

Steps 1001-1003 can be similar as the steps 901-903 of the method 900 of FIG. 9 and will not be described for the sake of brevity.

At step 1004, the automation system 700 may receive a structured query 705. Structured query 705 may be provided by user 704 and comprise one or more parameters.

At step 1005, the machine learning models 715 may identify labels corresponding to the one or more parameter and a response to the structured query 705.

At step 1006, the automation system 700 may use the trained machine learning tools (e.g., the machine learning models 715) to identify portions of the structured input data 703 corresponding to the identified labels. Labeled structured input data 720 may be generated based at least party on the identified portion of the structured input data 703 and the corresponding identified labels.

At step 1007, the automation system 700 may use the identified portions of the labeled structured input data 720 to generate a response to the structured query 705.

Figure 11:
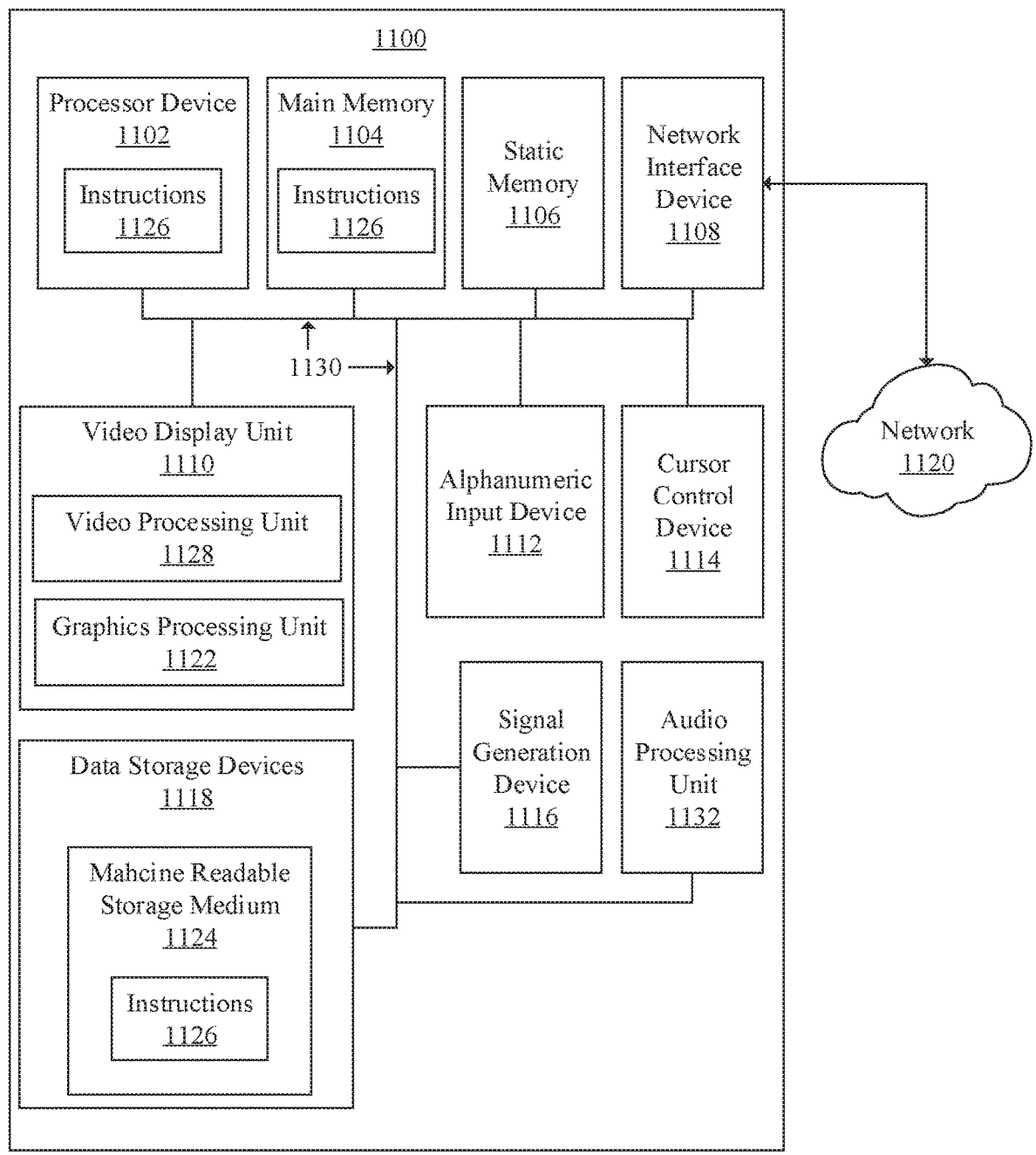
FIG. 11 is a diagram illustrating an exemplary computer that may perform processing in some embodiments and in accordance with aspects of the present disclosure.

FIG. 11 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment. Examples of cloud computing infrastructures in which the described embodiments can be implemented include Microsoft® Azure, Amazon® Web Services (AWS) and Google® Cloud. Other cloud computing infrastructures can also be used.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processor device 1102, a main memory 1104 (e.g., read-only memory (ROM), flash memory, dynamic random access memory (DRAM) such as synchronous DRAM (SDRAM) or Rambus® DRAM (RDRAM), etc.), a static memory 1106 (e.g., flash memory, static random access memory (SRAM), etc.), and a data storage device 1118, which communicate with each other via a bus 1130.

Processor device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor device 1102 may also be one or more special-purpose processing devices such as an application specific integrated circuit (ASIC), a field programmable gate array (FPGA), a digital signal processor (DSP), network processor, or the like. The processor device 1102 is configured to execute instructions 1126 for performing the operations and steps discussed herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a signal generation device 1116 (e.g., a speaker), a graphics processing unit 1122, video processing unit 1128, and audio processing unit 1132.

The data storage device 1118 may include a machine-readable storage medium 1124 (also known as a computer-readable medium) on which is stored one or more sets of instructions or software 1126 embodying any one or more of the methodologies or functions described herein. The instructions 1126 may also reside, completely or at least partially, within the main memory 1104 and/or within the processor device 1102 during execution thereof by the computer system 1100, the main memory 1104 and the processor device 1102 also constituting machine-readable storage media.

In one implementation, the instructions 1126 include instructions to implement functionality corresponding to the components of a device to perform the disclosure herein. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

The invention claimed is:

1. A method of process automation of financial report validation comprising:
   receiving historical process data associated with one or more computer systems executing the process, which comprises at least in part:
      receiving unstructured process input data comprising one or more data elements that correspond to at least one type of financial data category from a plurality of different types of financial data categories relevant to financial report validation, wherein the unstructured process input data includes at least a portion of unstructured stream data and unstructured image data;
   transforming the unstructured input data to indexed and searchable structured input data by applying process mining techniques to the historical process data;
   generating an end-to-end process model for the process;
   generating a digital representation of the process, based at least partly on the process model;
   determining, from the digital representation, automation candidates;
   configuring one or more automation tools for the automation candidates by training one or more machine learning tools to apply one or more financial domain labels to at least one portion of the structured input data due to the at least one portion of the structured input data including one or more types of data elements that correspond to one or more financial data categories;
   receiving a structured query based on at least one financial report document, the structured query includes at least one financial domain parameter;
   in response to the structured query:
      identifying one or more the financial domain labels, via the automation tools, that correspond to the at least one financial domain parameter;
      identifying one or more portions of the structured input data that includes at least one data element corresponding to the identified financial domain labels, wherein the at least one corresponding data element comprises: an instance of a document table received in the unstructured process input data and related to the first type of revenue category;
      validating the at least one financial report document, based at least partly on the identified portions of the structured input data; and
      generating validation output of the at least one financial report document of the structured query based on the one or more identified portions of the structured input data.

2. The method of claim 1, wherein the historical process data comprises one or more of input/output of the one or more computer systems; user and/or application footprint; digital exhaust and event logs.

3. The method of claim 1, wherein the automation candidates comprise points of inefficiency in the process.

4. The method of claim 1, wherein the automation tools comprise one or more of natural language processing, natural language generation, process mining, computer-vision, machine translation, OCR, named entity recognition using Microsoft® Cognitive Services, multi-channel conversational AI using Microsoft® LUIS, and Microsoft® Bot Framework.

5. The method of claim 1, wherein automation tools comprise one or more machine learning networks, and configuring the tools comprise training the machine learning networks.

6. The method of claim 1,
wherein configuring the automation tools comprises training the machine learning tools to label portions of the structured input data according to one or more of the categories relevant to validation of the financial report;
wherein receiving the structure query comprises: receiving a financial report tagged with a respective category;
identifying labels corresponding to the respective tagged category;
using the trained machine learning tools identifying portions of the structured input data corresponding to the identified labels;
wherein generating validation output further comprises: regenerating the received financial report with visual elements indicating result of the validating.

7. The method of claim 6, further comprising regenerating the financial report with a corresponding audit trail comprising pathways of generating the indicated result of the validating.

8. The method of claim 1 wherein the unstructured data comprises one or more of pdf documents, text documents, Microsoft® Word® documents, Microsoft® Excel® documents, Microsoft® PowerPoint® documents, Google® Sheets, Google® Docs, Google® Slides, Google® Forms, images, spreadsheets, presentation slides, and word processor files.

9. The method of claim 1, wherein receiving the structured query comprises receiving the structured query with a chatbot.

10. Non-transitory computer storage that stores executable program instructions that, when executed by one or more computing devices, configure the one or more computing devices to perform operations for financial report validation comprising:
receiving historical process data associated with one or more computer systems executing the process, which comprises at least in part:
receiving unstructured process input data comprising one or more data elements that correspond to at least one type of financial data category from a plurality of different types of financial data categories relevant to financial report validation, wherein the unstructured process input data includes at least a portion of unstructured stream data and unstructured image data;
transforming the unstructured input data to indexed and searchable structured input data by applying process mining techniques to the historical process data;
generating an end-to-end process model for the process;
generating a digital representation of the process, based at least partly on the process model;
determining, from the digital representation, automation candidates;
configuring one or more automation tools for the automation candidates by training one or more machine learning tools to apply one or more financial domain labels to at least one portion of the structured input data due to the at least one portion of the structured input data including one or more types of data elements that correspond to one or more financial data categories;
receiving a structured query based on at least one financial report document, the structured query includes at least one financial domain parameter;
in response to the structured query:
identifying one or more the financial domain labels, via the automation tools, that correspond to the at least one financial domain parameter;
identifying one or more portions of the structured input data that includes at least one data element corresponding to the identified financial domain labels, wherein the at least one corresponding data element comprises: an instance of a document table received in the unstructured process input data and related to the first type of revenue category;
validating the at least one financial report document, based at least partly on the identified portions of the structured input data; and
generating validation output of the at least one financial report document of the structured query based on the one or more identified portions of the structured input data.

11. The non-transitory computer storage of claim 10, wherein the historical process data comprises one or more of input/output of the one or more computer systems; user and/or application footprint; digital exhaust and event logs.

12. The non-transitory computer storage of claim 10, wherein the automation candidates comprise points of inefficiency in the process.

13. The non-transitory computer storage of claim 10, wherein the automation tools comprise one or more of natural language processing, natural language generation, process mining, computer-vision, machine translation, OCR, named entity recognition using Microsoft® Cognitive Services, multi-channel conversational AI using Microsoft® LUIS, and Microsoft® Bot Framework.

14. The non-transitory computer storage of claim 10, wherein automation tools comprise one or more machine learning networks, and configuring the tools comprise training the machine learning networks.

15. The non-transitory computer storage of claim 10,
wherein configuring the automation tools comprises training the machine learning tools to label portions of the structured input data according to one or more of the categories relevant to validation of the financial report;
wherein receiving the structure query comprises: receiving a financial report tagged with a respective category;
identifying labels corresponding to the respective tagged category;
using the trained machine learning tools identifying portions of the structured input data corresponding to the identified labels;

validating the financial report, based at least partly on the identified portions of the structured input data; and wherein generating validation output further comprises: regenerating the received financial report with visual elements indicating result of the validating.

16. The non-transitory computer storage of claim 15, wherein the operations further comprise regenerating the financial report with a corresponding audit trail comprising pathways of generating the indicated result of the validating.

17. The non-transitory computer storage of claim 10, wherein the unstructured data comprises one or more of pdf documents, text documents, Microsoft® Word® documents, Microsoft® Excel® documents, Microsoft® PowerPoint® documents, Google® Sheets, Google® Docs, Google® Slides, Google® Forms, images, spreadsheets, presentation slides, and word processor files.

18. The non-transitory computer storage of claim 10, wherein receiving the structured query comprises receiving the structured query with a chatbot.

* * * * *